(12) United States Patent
Hallinan

(10) Patent No.: US 7,099,551 B2
(45) Date of Patent: Aug. 29, 2006

(54) CABLING APPARATUS

(76) Inventor: Paul Hallinan, 6 Shoolhouse Lane, Santry, Dublin 9 (IE)

( * ) Notice: Subject to any disclaimer, the term of this patent is extended or adjusted under 35 U.S.C. 154(b) by 25 days.

(21) Appl. No.: 10/488,408

(22) PCT Filed: Aug. 30, 2002

(86) PCT No.: PCT/IE02/00127

§ 371 (c)(1),
(2), (4) Date: Feb. 26, 2004

(87) PCT Pub. No.: WO03/019747

PCT Pub. Date: Mar. 6, 2003

(65) Prior Publication Data
US 2004/0213541 A1    Oct. 28, 2004

(30) Foreign Application Priority Data
Aug. 30, 2001 (IE) ................ S2001/0787

(51) Int. Cl.
*G02B 6/00* (2006.01)
*H02G 3/00* (2006.01)
*H02G 3/04* (2006.01)
*H02G 3/10* (2006.01)
*H02G 13/00* (2006.01)

(52) U.S. Cl. .................... 385/136; 174/48; 174/49; 174/68.3; 174/95; 174/96; 174/97; 174/98

(58) Field of Classification Search ............... 385/136, 385/137, 147; 174/48, 49, 68.3, 95–98
See application file for complete search history.

(56) References Cited

U.S. PATENT DOCUMENTS 5,235,136 A * 8/1993 Santucci et al. ........... 174/68.3

FOREIGN PATENT DOCUMENTS

EP    1087485 A1 *  3/2001  ............... 174/68.3

* cited by examiner

*Primary Examiner*—Frank G. Font
*Assistant Examiner*—Jerry Martin Blevins
(74) *Attorney, Agent, or Firm*—Porter Wright, Morris & Arthur, LLP

(57) ABSTRACT

A cabling duct (10) comprises an elongate channel (1) having a longitudinal aperture (2) and an elongate lid (7). The opposite edges of the lid releasably engage the opposite edges of the aperture to close the aperture and the lid 7 is integrally connected to the channel by a flexible web (12).

12 Claims, 7 Drawing Sheets

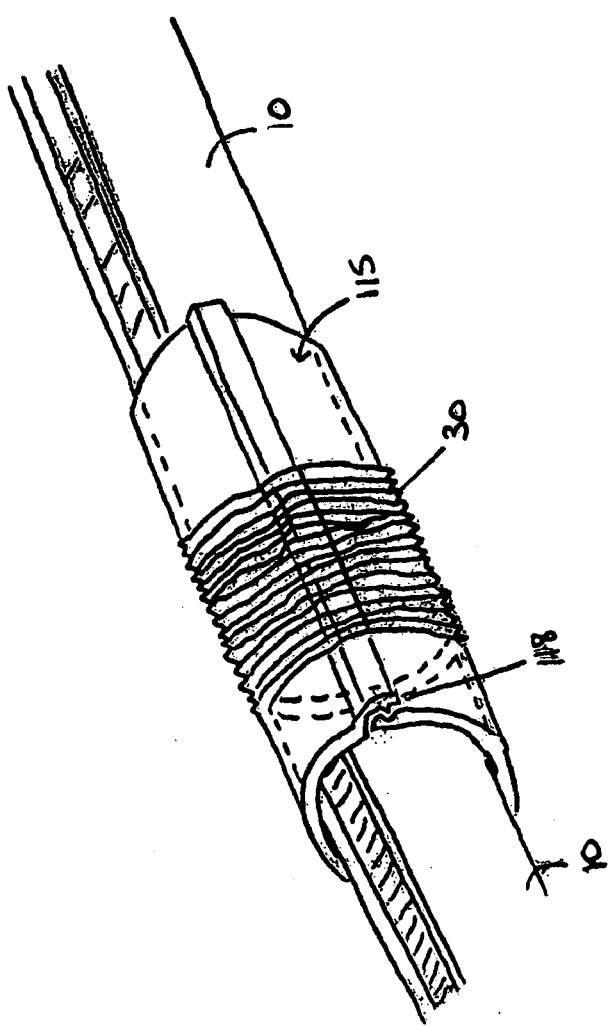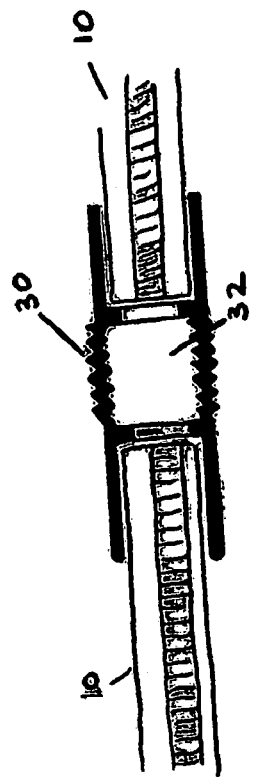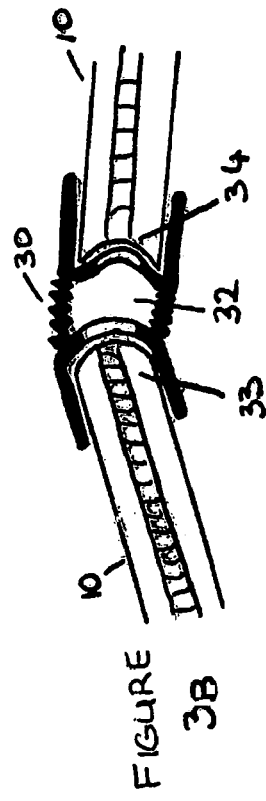
Figure 3

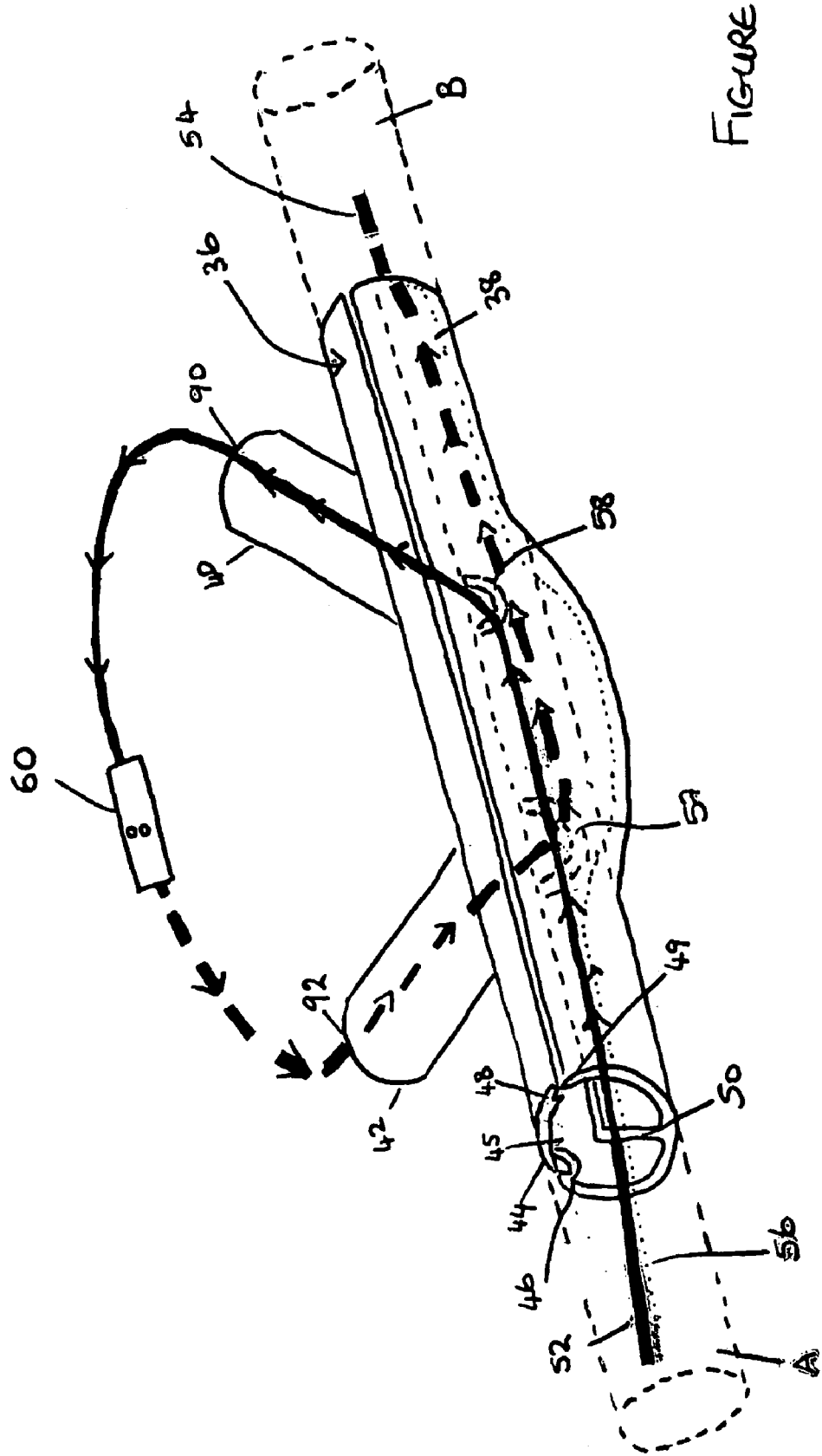

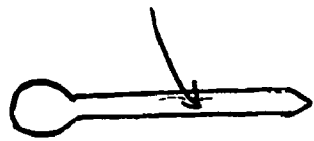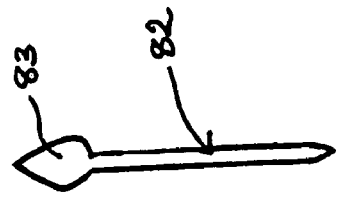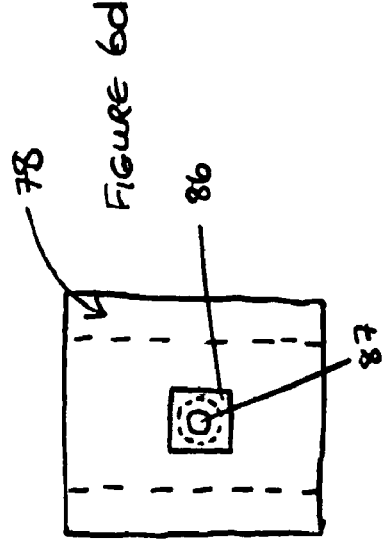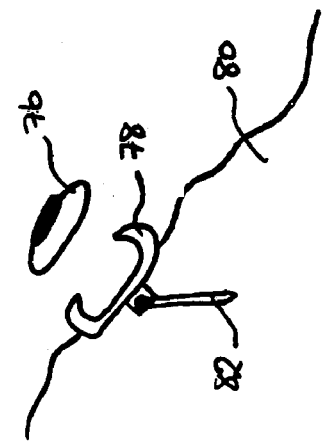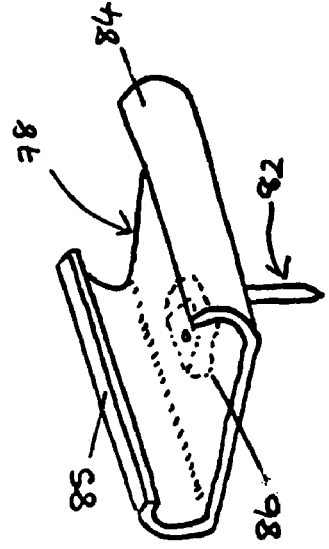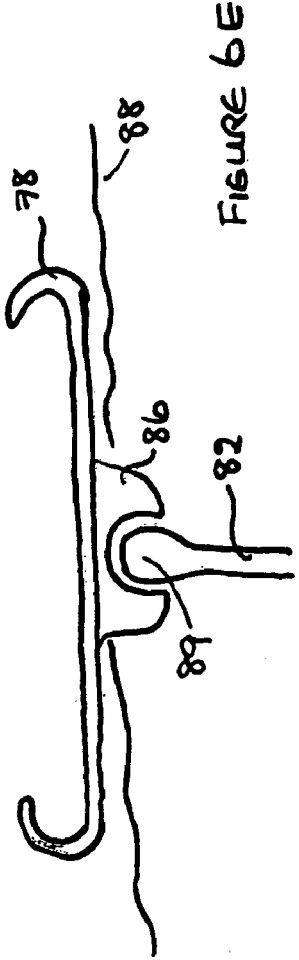
Figure 6B
Figure 6A
Figure 6d
Figure 6
Figure 6c
Figure 6E

CABLING APPARATUS

FIELD OF THE INVENTION

The invention relates to cabling ducts, couplers, joints and pegging units for cabling and other ducting applications such as drainage.

BACKGROUND TO THE INVENTION

Cabling ducts have been known for many years. In recent years domestic and business use of electrical and telephone cabling has steadily grown to accommodate, for instance, increasing telecommunications and networking applications. Recent years have also seen the increased deployment of cables employing new materials such as fibre optics. At many sites, cabling has to be altered after installation to keep pace with the expanding and ever-changing demands. Further alterations to cabling may also be needed after installation for fault repairs.

In order to inspect or alter cables laid underground in conventional ducts, it is first necessary to dig up the entire duct and break the duct to gain access to the cabling. When the inspection or alterations are completed, the cabling must be threaded into new ducts before being reburied underground. This process is thus time-consuming, labour-intensive and expensive.

Two-piece ducts are already known wherein a cover is removable from a duct channel thereby facilitating cable access. However such two-piece ducts require that the cover be manufactured as a separate component from the duct channel and afterwards assembled by connecting the duct channel to the cover.

SUMMARY OF THE INVENTION

According to the invention there is provided a cabling duct comprising an elongate channel having a longitudinal aperture and an elongate lid, wherein the opposite edges of the lid releasably engage the opposite edges of the aperture to close the aperture, and wherein the lid is connected to the channel by a flexible web.

Preferably, the lid and channel are integrally connected to one another by the flexible web.

According to a second aspect of the invention there is provided a cable joiner characterised in that the joiner is openable and is manufactured as one piece.

According to a third aspect of the invention there is provided a duct coupler characterised in that the coupler is openable and is manufactured as one piece and is capable of coupling ducts positioned at angles to each other.

Preferably the duct coupler could be used as a maintenance mechanism by its use to existing, or new ducts, damaged in excavation, to give such ducts a sleeving to re-protect and waterproof them.

According to a fourth aspect of the invention there is provided a pegging unit for ducting characterised in that a receiving component thereof is capable of swivelling whilst the rest of the pegging unit retains a stable position in the ground.

According to a fifth aspect of the invention there is provided an integrated cabling system comprising cabling ducts, couplers and joiners characterised in that each component is openable and can each be manufactured as single components.

BRIEF DESCRIPTION OF THE DRAWINGS

Embodiments of the invention will now be described, by way of example, with reference to the accompanying drawings, in which;

FIG. 1A is a partial perspective view of the openable one-piece duct of FIG. 1;

FIG. 2A is a cross-section of the openable one-piece coupler of FIG. 2;

FIG. 2B is a cross-section of the catch mechanism used in the openable one-piece coupler shown in FIGS. 2 and 2A;

FIG. 3 is a perspective view of a second embodiment of an openable-one-piece coupler;

FIG. 3A is a cross-section of the openable one-piece coupler of FIG. 3 where in use the connecting ducts are aligned in parallel;

FIG. 3B is a cross-section of the openable one-piece coupler of FIG. 3 where in use the connecting ducts are aligned at an angle to each other;

FIG. 4 is a perspective cutaway view of an openable one-piece joiner;

FIG. 6 is a diagram showing the use of a pegging unit for pegging and clipping ducts into a desired position when the duct route requires traversal of a low bank;

FIG. 6A is a diagram of a rod peg from the pegging unit of FIG. 6 showing the shape of the rod peg before it has been hammered into the ground;

FIG. 6B is a diagram of a rod peg from the pegging unit of FIG. 6 showing the shape of the rod peg after it has been hammered into the ground;

FIG. 6C is a perspective view of the assembled top receiver and rod peg from the pegging unit shown in FIG. 6;

FIG. 6D is a top plan view of the top receiver of FIG. 6C;

FIG. 6E is a side elevation view of the assembled rod peg and top receiver wherein the rod peg is hammered into the ground.

DESCRIPTION OF PREFERRED EMBODIMENTS

Figure 1:
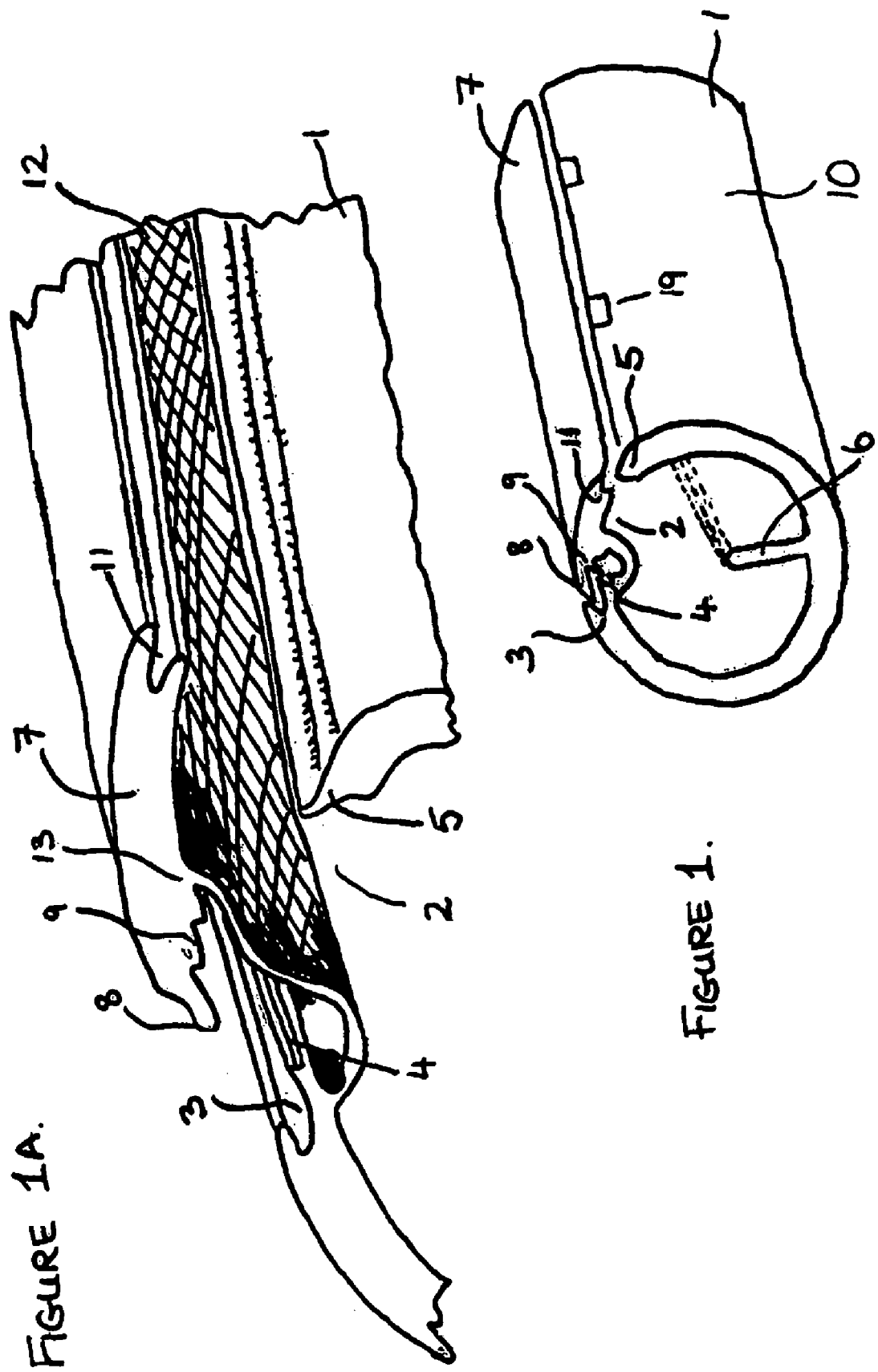
FIG. 1 is a perspective view of an openable one-piece cabling duct.

FIG. 1 shows a one-piece openable duct 10 which comprises an elongate duct channel 1 having a longitudinal aperture 2 which can be closed by an elongate lid 7. Whilst the duct is depicted in FIG. 1 as being substantially cylindrical in shape, in practice the duct can be of any cross-sectional shape allowing its use in different terrains. Also, the duct can be colour coded during its manufacture to suit separator sequences for cable route designation. The duct could optionally be provided with at least one outwardly pointing protrusion (not shown) projecting from its outside surface that would act to stabilise the positioning of the duct in ground where the soil bank is low.

FIG. 1A shows in greater detail the longitudinal aperture 2 in the duct channel 1. The aperture 2 is formed along one longitudinal edge with two staggered grooves 3 and 4 and along the other longitudinal edge with a lip 5. The lid 7 is formed with two staggered lips 8, 9 along one longitudinal edge and a groove 11 along the other longitudinal edge. The lips 8, 9 are complementary in cross-section to the grooves 3,4 and the lip 5 is complementary in cross-section to the groove 11. The lid 7 is disposed relative to the duct channel 1 so that its two lips 8 and 9 face towards the two grooves 3 and 4 and the groove 11 faces toward the lip 5.

The lid 7 is integrally attached to the duct channel 1 by a flexible web 12 which can take the form of a mesh or a continuous sheet, for example 1/8" thick. The web 12 extends substantially along the full length of the channel 1 and joins the inside surface of the lid 7 at an intermediate position 13 between the lips 8 and 9 and the groove 11 to the inside surface of the duct channel 1 at a position proximal to the aperture 2. The web 12 forms a curved, flexible hinging mechanism connecting the lid 7 to the duct channel 1.

The duct 10 can be made in one piece from a tough, environmental-resistant plastics material by an extrusion moulding process. The material of the duct channel is sufficiently resilient for the lid 7 to be fitted to the longitudinal aperture 2 in the manner now to be described.

To close the duct channel 1, the two lips 8 and 9 are first forced into the grooves 3 and 4 respectively, which causes the web 12 to curl into the hollow of the duct channel 1. Downward (as seen in FIG. 1A) pressure is now applied to the edge of the lid 7 having the groove 11 to cause this edge of the lid 7 to lie on top of the edge of the aperture 2 having the lip 5. Further downward pressure is then applied to the edge of the lid 7 having the groove 11 thereby resiliently deflecting the lip 5 downwardly until finally it "snaps" upwardly into place into the groove 11.

When both sides of the lid 7 are in engagement with the respective edges of the aperture 2, the web 12 is fully curled up in the hollow of the duct channel 1 so as to reduce any obstruction to the cables running through the duct channel 1. On closure of the lid 7 in the aperture 2 the cables contained within the duct channel 1 are enclosed within a substantially watertight duct.

Once closed the duct 10 can be re-opened by prying apart the edges of the aperture 2 by hand, with a screwdriver or other implement. The prying open of the duct can be facilitated by the optional inclusion of pry positions 19 on the exterior of the duct channel 1.

Optionally at least one longitudinal divider 6 extends from the inside surface of the duct channel 1 partially across the width of the channel 1 towards the aperture 2, and serves to separate cables contained within the channel. The divider(s) 6 can be moulded as an integral part of the duct or can be manufactured as separate components and fitted to the duct as required.

The duct channel 1 could also include a metal strip and/or rods with the dual function of increasing the strength of the duct channel 1 and providing a convenient means of locating the ducts from above ground after the ducts have been laid underground.

The duct channel 1 could further include a reflective or fluorescent element to increase the visibility of the duct and facilitate the detection of its location during night-time excavation or in tunnels and thereby reduce accidental damage to the ducts and cables caused during such excavations.

Figure 2:
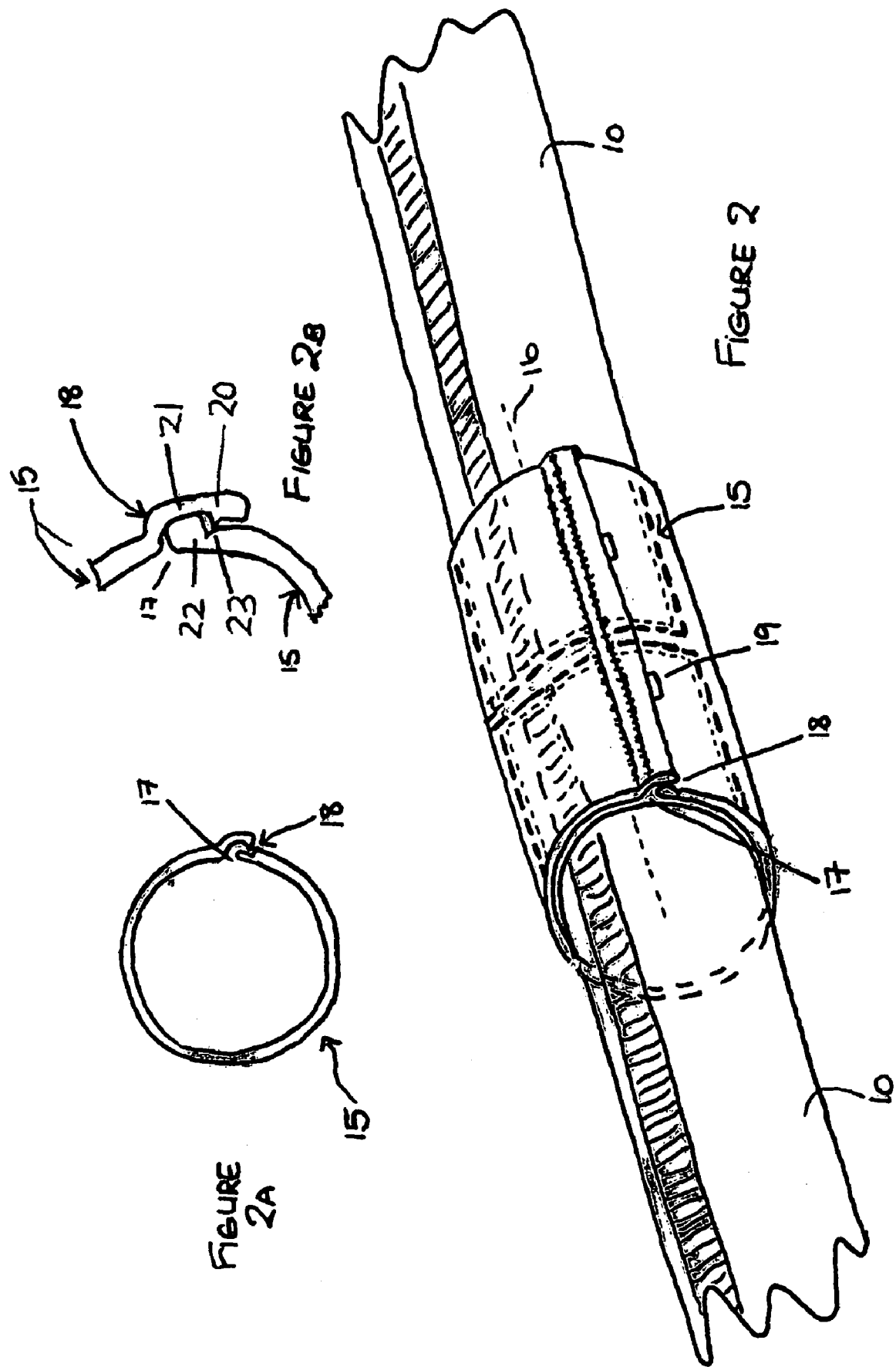
FIG. 2 is a perspective view of a first embodiment of an openable one-piece coupler.

FIG. 2 shows one embodiment of a one-piece openable coupler 15 whose purpose is to connect different lengths of ducts thereby facilitating multiple access to cabling, inspection of cabling and temporary re-routing of cabling for site-works in the vicinity thereof. Whilst the one-piece openable coupler 15 is preferably used with the above-described one-piece lidded duct, it can also be used with conventional ducts albeit with reduced access to cabling in the ducts.

The coupler 15 is substantially cylindrical in shape with a longitudinal axis 16. However, it should be appreciated that the coupler 15 can be of any cross-sectional shape appropriate to fit the ducts it is intended to join. The coupler 15 is divided in a direction parallel to its longitudinal axis 16. The elasticity of the coupler 15 enables the edges of the coupler 15 on either side of the division 17 to be pulled apart to allow access to the interior of the coupler 15 and any ducts 1 therein. The walls of the coupler 15 on either side of the division 17 can be secured together by a catch mechanism 18. The coupler 15 can be opened again by prying apart the walls of the coupler 15 at a pry position 19 by hand, with a screwdriver or other implement.

FIG. 2A shows a cross-section of the coupler 15 wherein it can be seen that the coupler 15 and catch mechanism 18 are made as a single piece. In general a coupler is of a shorter length and thinner plastics material than a duct and consequently has less structural integrity than a duct. Thus repetitive prying open of the one-piece openable coupler 15 is likely to cause more deformation to the coupler at the edges of the cut 17 than might be caused to the above-described one-piece lidded duct if the same repetitive prying action were applied to the edges of its lid. Thus the catch mechanism of the coupler 15 requires a more robust and closer fitting securing means than the lid of the openable duct 10.

FIG. 2B shows the catch mechanism 18 in more detail. The catch mechanism 18 comprises a tooth 20 and groove 21 on the edge of the coupler on one side of the division 17. The catch mechanism 18 further comprises a lip 22 and triangular groove 23 on the edge of the coupler 15 on the opposite side of the division 17.

The components of the catch mechanism 18 are arranged so that when the opposite edges of the division 17 are forced together the tooth 20 engages with the triangular groove 23 and the lip 22 engages with the groove 21 in a "snap action" operation.

FIG. 3 shows another embodiment of the one-piece openable coupler 115 in which the wall of the coupler 115 is constructed with an accordion-like bellows element 30. This bellows element 30 confers an additional flexibility to the coupler 115 thereby enabling the coupler 115 to accommodate the coupling of ducts 10 that are positioned at angles to each other.

As with the first embodiment of the coupler, whilst the second embodiment of the coupler is preferably used with the above-described one-piece lidded duct, it can also be used with conventional ducts albeit with reduced access to cabling in the ducts.

In the following description of the second embodiment of the one-piece openable coupler 115, the word duct is intended to encompass both conventional ducts and one-piece lidded ducts. Similarly whilst FIG. 3 shows the one-piece openable coupler 115 to join different lengths of the one-piece openable ducts 10, this should not be construed as meaning that the coupler 115 can only be used with the one-piece openable ducts 10. Indeed, the interpretation of FIG. 3 should be extended to include the use of the one-piece openable coupler 115 with other ducts.

The coupler 115 is provided with a similar catch mechanism 118 to that of the first embodiment of the coupler.

FIG. 3A shows how the coupler 115 would be used to couple ducts that are positioned parallel with each other and FIG. 3B shows how the coupler 115 would be used to couple ducts that are positioned at angles to each other. Looking at FIG. 3A, the coupler 115 is provided with abutments (not shown) within its interior which prevent a duct 10 from being progressed from one end of the coupler 115 through to the other end of the coupler 115. The coupler 115 is provided with two such abutments and the abutments are positioned apart from each other within the coupler 115. Consequently, when ducts 10 are inserted into each end of the coupler 115, and their progress into the coupler 115 is arrested by the abutments, the ducts 10 do not contact each other. The resulting gap 32 between the ducts 10 is aligned with the bellows element 30. Turning to FIG. 3B, it can be seen that it is the alignment of the gap 32 and the bellows element 30 which confers the flexibility on the coupler 115 and enables it to couple ducts 10 that are positioned at angles to each other.

To enhance the coupling between ducts positioned at angles to each other, the openable lidded ducts 10 could be optionally constructed so as to be convex shaped at one end and concave shaped at the other. In use, such ducts would be arranged in the coupler 115 so that the convex end 33 of one of the ducts faced the concave end 34 of the other duct.

FIG. 4 shows an openable joiner 36 that facilitates inspection of cables, the formation of joints between different lengths of cabling and the insertion of new cables into a duct.

Whilst the one-piece openable joiner 36 is preferably used with the above-described one-piece lidded duct, it can also be used with conventional ducts albeit with reduced access to cabling in the ducts. In the following description of the one-piece openable joiner 36, the word duct is intended to encompass both conventional ducts and one-piece lidded ducts.

The joiner 36 comprises a hollow main barrel 38 of same diameter as the ducts with which it is used. Two secondary channels 40 and 42 branch from the same side of the main barrel 38 and in use are inclined to the horizontal at sufficient angle to allow any contacting water to run off. This feature enhances the water-resistance of the joiner 36. The two secondary channels 40 and 42, are also of sufficient length, so that in use, a curve-formed by looping cabling between the secondary channels 40 and 42 is of sufficient radius to reduce the bending angle of the cabling and thus reduce the risk of cable fibre breakage. In constructing the joiner 36, the secondary channels 40 and 42 could either be moulded together with the main barrel 38 or manufactured as separate components and later jointed to the main barrel 38.

The joiner 36 has an aperture 45 in one of its walls and is provided with a lid 44 that covers the aperture 45. The lid 44 is connected to the joiner 36 via a web 46 in a similar manner to that described for the one-piece openable duct. One side of the lid 44 is provided with a groove 48 and the other side of the lid 44 is provided with two lips (not shown). The wall of the joiner 36 on one side of the aperture 45 is provided with two grooves (not shown) and on the opposite side of the aperture 45, the wall of the joiner 36 is provided with a lip 49. The lid 44 is disposed relative to the joiner 36, so that its two lips face towards the two grooves in the wall of the main barrel 38, and so that the groove 48 faces toward the lip 49. Applying pressure to the lid 44 in a similar manner to that described earlier for the openable ducts, closes the joiner 36. Once closed, the joiner 36 is openable by prying by hand, screwdriver or other implement.

In the region 100 between the secondary channels 40 and 42, the wall of the main barrel 38 opposite the aperture 45 bulges away from the interior of the joiner 36.

The joiner 36 is further optionally provided with at least one divider 50 to separate cables. The divider is provided with at least two grooves 57 and 58 that are aligned with the secondary channels 42 and 40 respectively.

In use, two ducts (shown in dashed lines) are inserted one at each end of the main barrel 38 and are progressed into the main barrel 38 until they encounter abutments therein (not shown). The duct inserted into the left-most end of the joiner 36 will be henceforth known as duct A and the duct connected to the right-most end of the joiner 36 will be henceforth known as duct B. It should be appreciated that the joiner 36 can be used in any orientation to connect to ducting as required.

FIG. 4 indicates how, in use, cables from a duct are threaded through the joiner 36, joined with other cables as required and threaded into another duct. A cable that requires joining with another cable is shown as a thick solid line and will henceforth be known as a first joined cable 52. The cable to which the first joined cable 52 is joined is shown as a dashed, thick line and will henceforth be known as the second joined cable 54. The other cables from the duct are shown as a dotted line and will henceforth be known as unjoined cables 56.

The operation of the openable joiner 36 will be described by way of an example wherein cables from duct A are joined to further cables and threaded into duct B, or in other words, the first joined cable in this example will be derived from duct A. Whilst this example focuses on the joining of cables from duct A, it should be recognised that the cables in question could alternatively be derived from duct B.

In the first stage of the cable-joining operation, all the cables from duct A are threaded into the main barrel 38. The unjoined cables 56 from duct A are then threaded completely through the main barrel 38 into duct B.

It is generally desirable that joints between cables be made in a separate location from the unjoined cables 56 in order to reduce any risk of damage to the unjoined cables 56 that might be caused by the joining process. It is also desirable that the joint not be formed inside the joiner 36 itself since joints formed between cables are relatively large and could occlude the hollow space of the joiner 36, thereby reducing access to the unjoined cables 56 contained therein.

Bearing these factors in mind, the first joined cable 52 is threaded through the main barrel 38 to the secondary channel 40 (i.e. the secondary channel furthest from the duct from which the first joined cable 52 is derived). If a divider 50 is present in the joiner 36 then the groove 58 enables a first joined cable 52 that is located on the side of the divider 50 furthest from the secondary channel 40 to be threaded through the divider 50.

The first joined cable 52 is threaded through the secondary channel 40 from the main barrel 38 to the exterior of the joiner 36 whereupon it is joined to a second joined cable 54 via a joint 58. The second joined cable 54 is threaded into secondary channel 42 and back into the main barrel 38 (through the groove 57 in the divider 50 if necessary) from which it is threaded into duct B.

The bulbous region 100 is present in the main barrel 38 between the secondary branches 40 and 42 in order to accommodate the additional cabling present in this region arising from the overlap of the first joined cable 52 and second joined cable 54 therein.

Figure 5C:
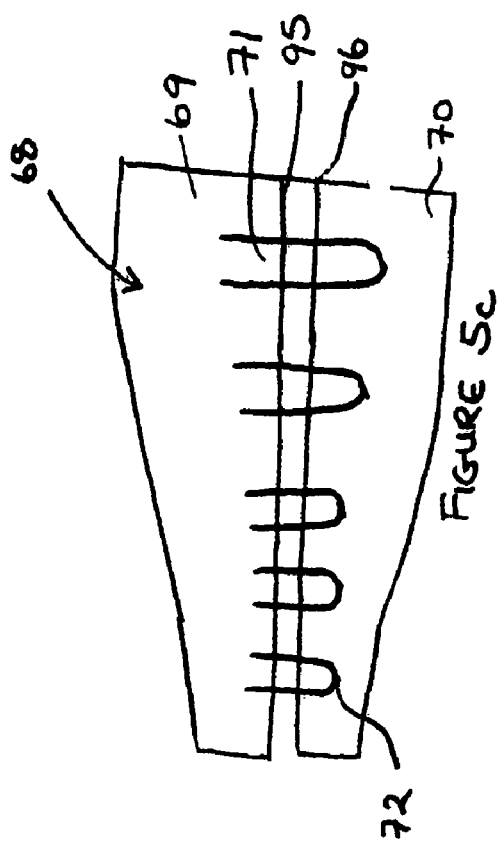
FIG. 5C is a side elevation of a first embodiment of the waterproof bung of FIG. 5B.
Figure 5D:
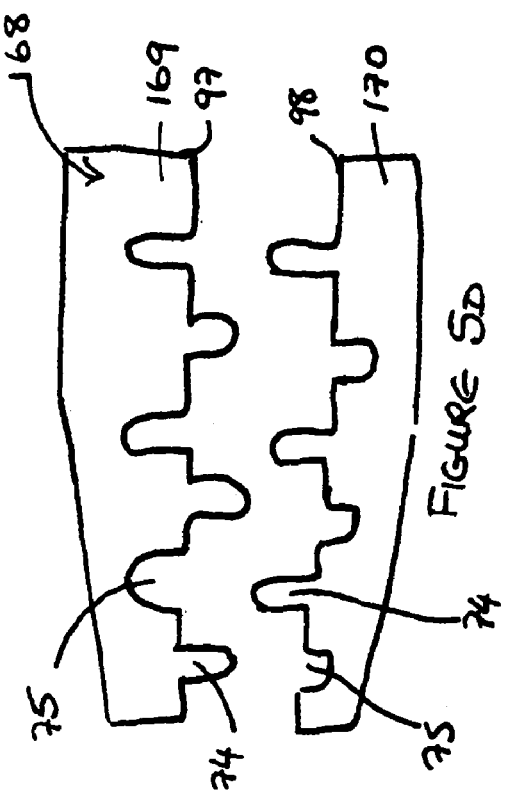
FIG. 5D is a side elevation of a second embodiment of the waterproof bung of FIG. 5B.
Figure 5B:
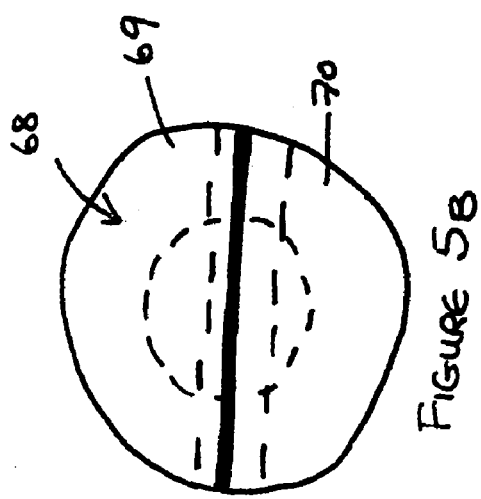
FIG. 5B is a front view of a waterproof bung.
Figure 5A:
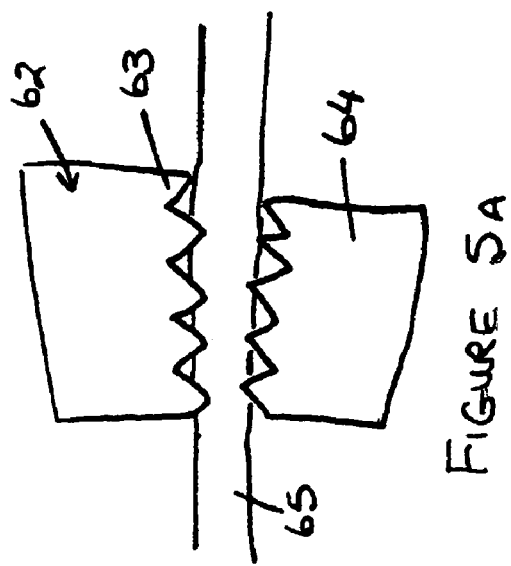
FIG. 5A is a side elevation of a sealant wedge.

The external openings 90 and 92 of the secondary channels 40 and 42, containing the first and second joined cables 52 and 54, are sealed via removable waterproof sealer wedges 62 shown in FIG. 5A or specially adapted waterproof bungs shown in FIG. 5B.

Looking first at the sealer wedge in FIG. 5A, it is a two-membered component of sufficient dimension to fill the external opening 90 of a secondary channel 40. The opposing sides of the two members 63 and 64 of the wedge 62 are serrated. In use, a cable 65 is placed between the two members 63 and 64 and the wedge 62 is inserted into the secondary channel 40. On insertion of the sealer wedge 62 into the secondary channel 40, the serrated edges of the two members 63 and 64 grip down on the cable 65 holding it in place.

Turning now to the specially adapted waterproof bung, two embodiments of the waterproof bung are shown in front elevation in FIG. 5B and in side elevation in FIGS. 5C and 5D respectively. Both embodiments of the waterproof bung 68 are frustum shaped and have the same front elevation view. Both embodiments are split in half, parallel to their longitudinal axes to permit entry of cabling as required. The two embodiments differ in the manner in which the two halves 69 and 70, of the frustum engage with each other. In FIG. 5C it can be seen that the inner face 95 of the half 69 is equipped with protrusions 71 which in use engage with depressions 72 on the opposing face 96 of the other half 70 of the bung 68. In FIG. 5D it can be seen that the opposing faces 97 and 98 of the two halves 169 and 170 of the bung 168 are provided with alternating protrusions 74 and depressions 75. The protrusions 74 and depressions 75 on face 97 are aligned to be in complement those on the other face 98, so that in use the protrusions 74 on 97 engage with the depressions 75 on 98 and the protrusions 74 on 98 engage with the depressions 75 on 97.

Both the sealer wedge 62 and the two embodiments of the waterproof bung 68 and 168 are removable from the external openings 90 and 92 of the secondary channels 40 and 42 and can be re-used as appropriate.

FIG. 6 depicts a pegging unit for use in pegging and clipping ducts into a desired position when the duct route requires traversal of a low bank. In this case a duct 76 is placed in a top receiver 78 which is fixed in position on the low bank 80 by means of a rod peg 82.

FIG. 6A depicts the rod peg 82 before hammering into the ground. The rod peg 82 is of variable length and has a substantially pointed dome-shaped top 83. The action of hammering the rod peg 82 into the ground flattens the point on its top. FIG. 6B shows the rod peg 182 after hammering into the ground, wherein it can be seen that the rod peg 182 is converted into a substantially round topped component.

FIG. 6C is a perspective view of the top receiver 78 assembled with the rod peg 82. The top receiver 78 is substantially flat with two curved opposing edges 84 and 85. FIG. 6D is a top plan view of the top receiver 78, and shows that in the centre of the top receiver 78 there is provided an adaptor 86. The adaptor 86 is provided with a pry-on position 87 which enables the top receiver 78 to be tapped or pried on to the top of a rod peg.

FIG. 6E shows a side elevation of the assembled rod peg 82 and top receiver 78 wherein the rod peg 78 is hammered into the ground 88. The rounded head 89 of the rod peg 82 together with the adaptor 86 form a ball and socket joint thereby providing swivelling and rotational flexibility to the assemblage which facilitates the positioning of a duct on the top receiver 78.

In use, the rod peg 82 is hammered into the ground and the top receiver 78 is pried onto the top of the rod peg 82 and rotated via the adaptor 86 to the required angle of the soil level. A duct is then partially slid into the top receiver 78 past one of its curved edges 84. Prying the duct past the second curved edge 85 of the top receiver 78 completes the positioning of the duct in the top receiver 78. On return of the second curved edge 85 to its original condition the duct is gripped into place in the top receiver 78. A reverse process is used for removal or re-routing of the pegging system. This pegging system, can be applied to any ducting system and is not restricted in use to the openable ducts described earlier.

Figure 7:
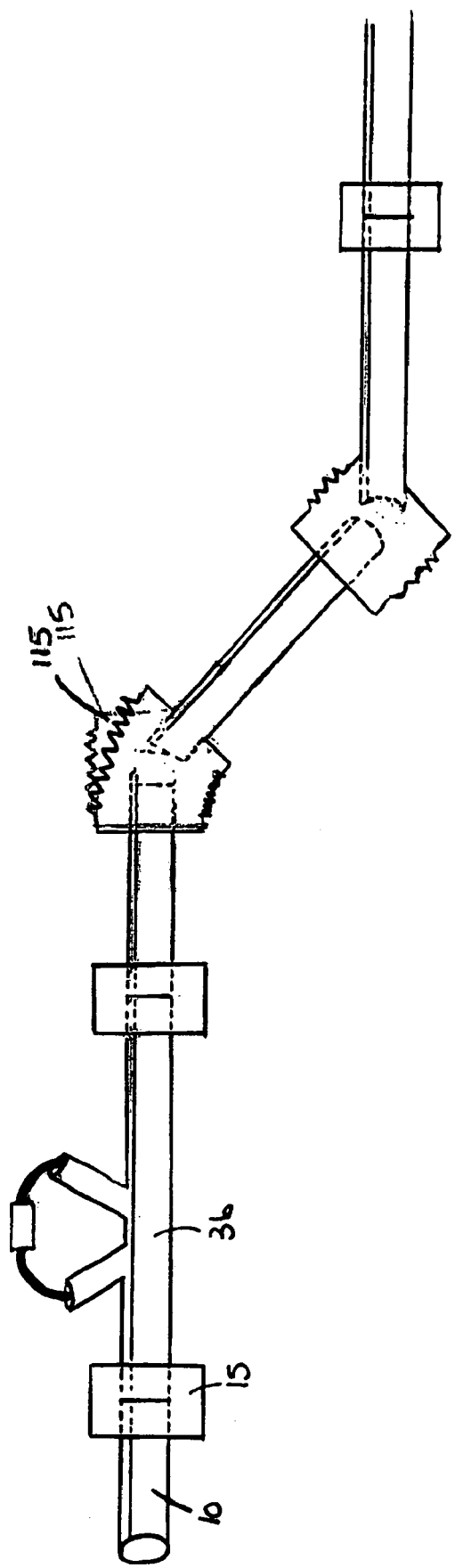
FIG. 7 is an integrated cabling system comprising the one-piece openable ducts of FIGS. 1 and 1A, the first embodiment of the one-piece openable coupler of FIGS. 2, 2A and 2B, the second embodiment of the one-piece openable coupler of FIGS. 3, 3A and 3B and the one-piece openable joiners of FIG. 4.

FIG. 7 shows how the openable lidded duct 10, the two embodiments of the openable coupler 15 and 115, and the openable joiner 36 could be combined to form an integrated cabling system providing convenient access to the cables for inspection, replacement, re-routing and addition.

The openable lidded ducts 10, the two embodiments of the openable coupler 15 and 115 and the openable joiner 36 can all be produced using any thermoplastic grade material, such as PVC, polyolefine, polyethylene and polypropylene to name but a few. These may be constructed using single, twin wall co-extrusion technologies or typical moulding technologies.

In order to assist and further promote the system, these materials may include additives such as:

blowing agents to facilitate formed structures fluorescent additives to facilitate ease of identification of ducting system colourant to facilitate identification of ducting system additives compatible with x-ray detection to facilitate searching for duct system subterrain metallic strip and particles for detection of ducting systems subterrain, using magnetic detection additives to facilitate the use of laser etching and welding equipment for laser marking and laser assembly of components fireproofing or flame retarding additives The invention is not limited to the embodiments described herein which may be modified or varied without departing from the scope of the invention.

The invention claimed is:

1. A cabling duct comprising:
    an elongate channel having a longitudinal aperture defined by an elongate first aperture edge and an opposed elongate second aperture edge;
    an elongate lid having an elongate first lid edge and an opposed elongate second lid edge;
    wherein said first lid edge and said first aperture edge have complimentary formations to selectively mate and release said lid to and from said channel along said first lid edge and said first aperture edge;
    wherein said second lid edge and said second aperture edge have complimentary formations to selectively mate and release said lid to and from said channel along said second lid edge and said second aperture edge;
    a flexible web connecting said lid to said channel and holding said lid in proximity to said channel when said first lid edge is released from said first aperture edge and said second lid edge is released from said second aperture edge; and
    wherein the web extends through the aperture when the first lid edge is released from the first aperture edge and the second lid edge is released from the second aperture edge.

2. A cabling duct as claimed in claim 1, wherein the web joins an inside surface of the lid to an inside surface of the channel.

3. A cabling duct as claimed in claim 1, wherein the web extends substantially along the full length of the channel.

4. A cabling duct as claimed in claim 1, wherein the web is in the form of a mesh.

5. A cabling duct as claimed in claim 1, wherein the first and second lid edges and the first and second channel edges have complementary formations which can be brought into and out of engagement by resilient deformation of at least one of the channel and the lid.

6. A cabling duct as claimed in claim 5, wherein the first lid edge has at least one lip which engages a corresponding groove of the first aperture edge, and the second lid edge has at least one groove which is engaged by at least one lip of the second aperture edge.

7. A cabling duct as claimed in claim 1, wherein a longitudinal divider extends from an inside surface of the channel and extends partially across a width thereof towards the longitudinal aperture.

8. A cabling duct as claimed in claim 1, wherein the duct is substantially cylindrical.

9. A cabling duct as claimed in claim 2, wherein the web is in the form of a mesh.

10. A cabling duct as claimed in claim 3, wherein the web is in the form of a mesh.

11. A cabling duct as claimed in claim 1, wherein the web is connected to the lid centrally between the first and second lid edges.

12. A cabling duct as claimed in claim 1, wherein the web is located entirely within a hollow of the channel when the first lid edge is mated to the first aperture edge and the second lid edge is mated to the second aperture edge.

* * * * *